(12) United States Patent
Kwon et al.

(10) Patent No.: US 11,042,060 B2
(45) Date of Patent: Jun. 22, 2021

(54) DISPLAY DEVICE

(71) Applicant: LG ELECTRONICS INC., Seoul (KR)

(72) Inventors: Haeok Kwon, Seoul (KR); Junhong Kim, Seoul (KR); Byeonduk An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/593,929

(22) Filed: Oct. 4, 2019

(65) Prior Publication Data

US 2021/0103186 A1   Apr. 8, 2021

(51) Int. Cl.
| | | |
|---|---|---|
| *G02F 1/13357* | (2006.01) | |
| *G06F 3/041* | (2006.01) | |
| *B64D 11/00* | (2006.01) | |
| *B60R 11/02* | (2006.01) | |
| *B60R 11/00* | (2006.01) | |

(52) U.S. Cl.
CPC .... *G02F 1/133602* (2013.01); *B60R 11/0235* (2013.01); *B64D 11/00152* (2014.12); *G06F 3/0412* (2013.01); *B60R 2011/0085* (2013.01)

(58) Field of Classification Search
CPC .. G06F 1/1637; G06F 3/0412; H04M 1/0268; H04M 1/0266; G02F 1/133602; B64D 11/00152; B60R 11/0235; B60R 2011/0085
USPC ..................................................... 349/58–60
See application file for complete search history.

(56) References Cited

U.S. PATENT DOCUMENTS

| | | | |
|---|---|---|---|
| 9,119,316 B2 | 8/2015 | Lee | |
| 9,329,640 B2* | 5/2016 | Chang | .................. G06F 1/1643 |
| 10,156,866 B2 | 12/2018 | Ishikawa et al. | |
| 2007/0002290 A1* | 1/2007 | Muraki | .............. G03G 21/1628 |
| | | | 353/119 |
| 2015/0103053 A1* | 4/2015 | Lin | ........................ G06F 3/0412 |
| | | | 345/175 |
| 2020/0257158 A1* | 8/2020 | An | ..................... G02F 1/133308 |

FOREIGN PATENT DOCUMENTS

| | | |
|---|---|---|
| KR | 1020160059585 | 5/2016 |
| KR | 1020170070524 | 6/2017 |
| KR | 101861602 | 5/2018 |

OTHER PUBLICATIONS

PCT International Application No. PCT/KR2019/001022, International Search Report dated Oct. 23, 2019, 3 pages.

* cited by examiner

*Primary Examiner* — Charles S Chang
(74) *Attorney, Agent, or Firm* — Lee, Hong, Degerman, Kang & Waimey

(57) ABSTRACT

A display device is disclosed. The display device includes a display panel; a frame positioned in a rear of the display panel and coupled to the display panel; a bottom frame coupled to a lower side of the frame; a plate positioned in a rear of the frame and hinge-coupled to the bottom frame; and a coupler positioned adjacent to an upper side of the frame and between the plate and the frame and enabling the plate to be detachable from the frame.

15 Claims, 15 Drawing Sheets

[Figure 1]
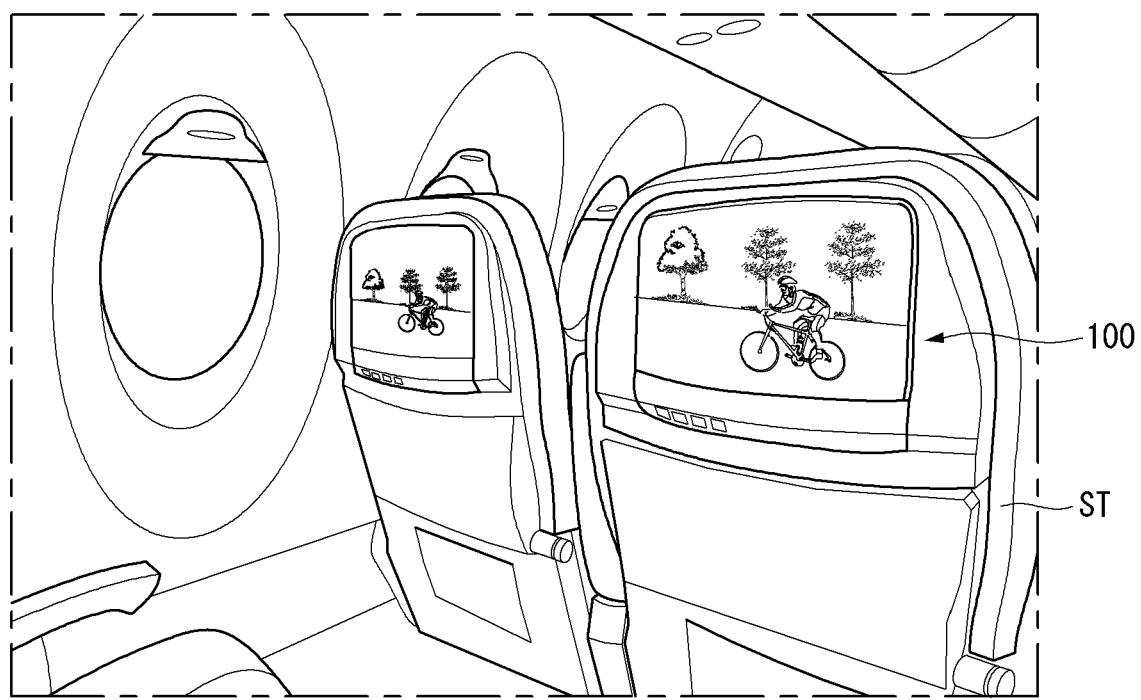

[Figure 2]
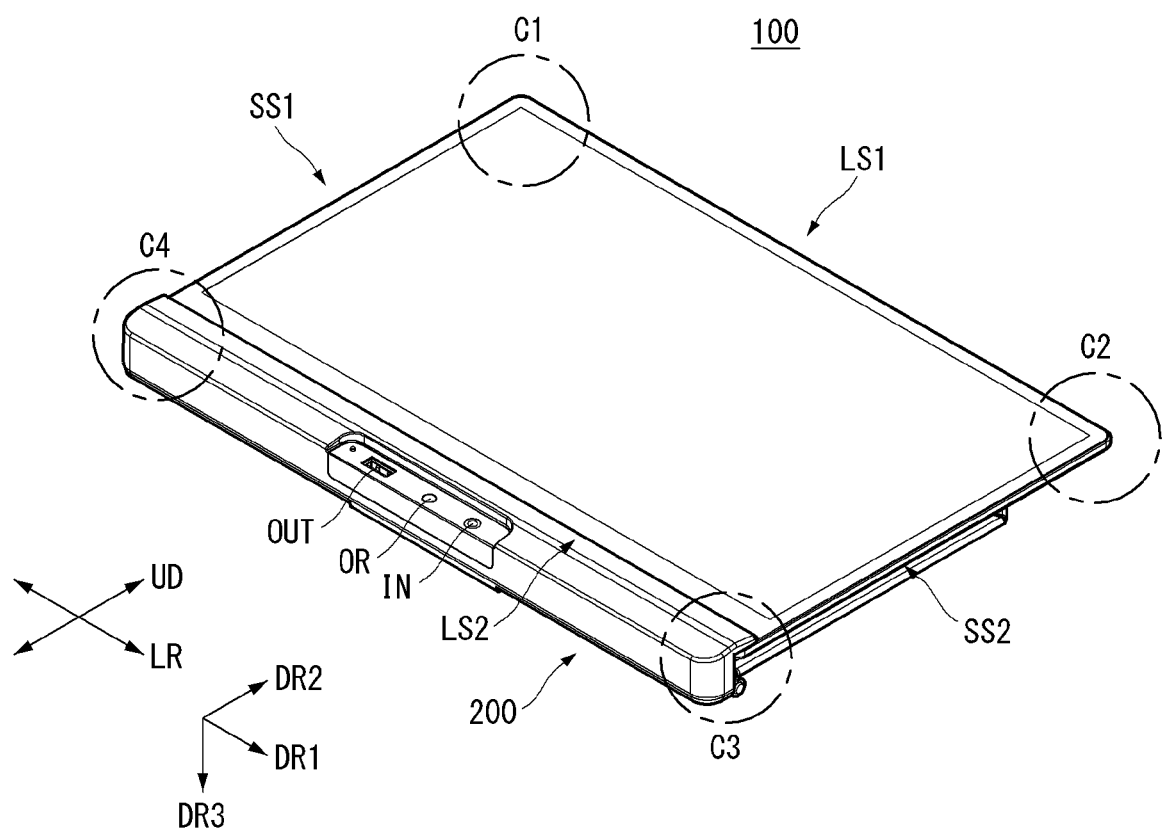

【Figure 3】
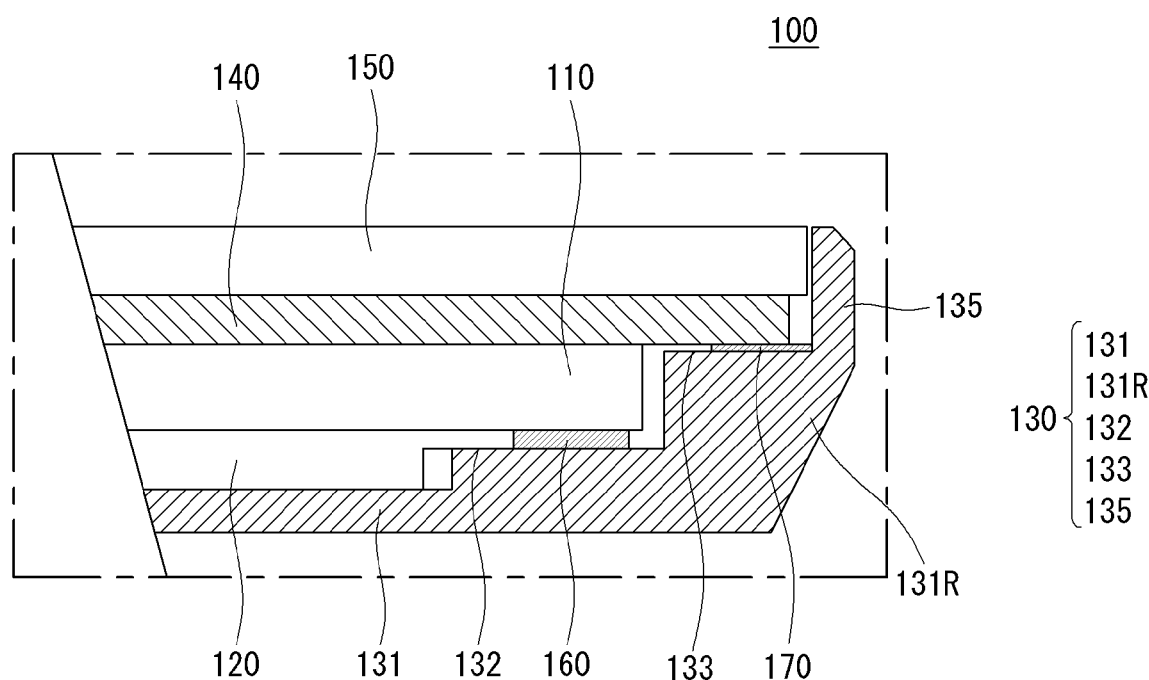

[Figure 4]
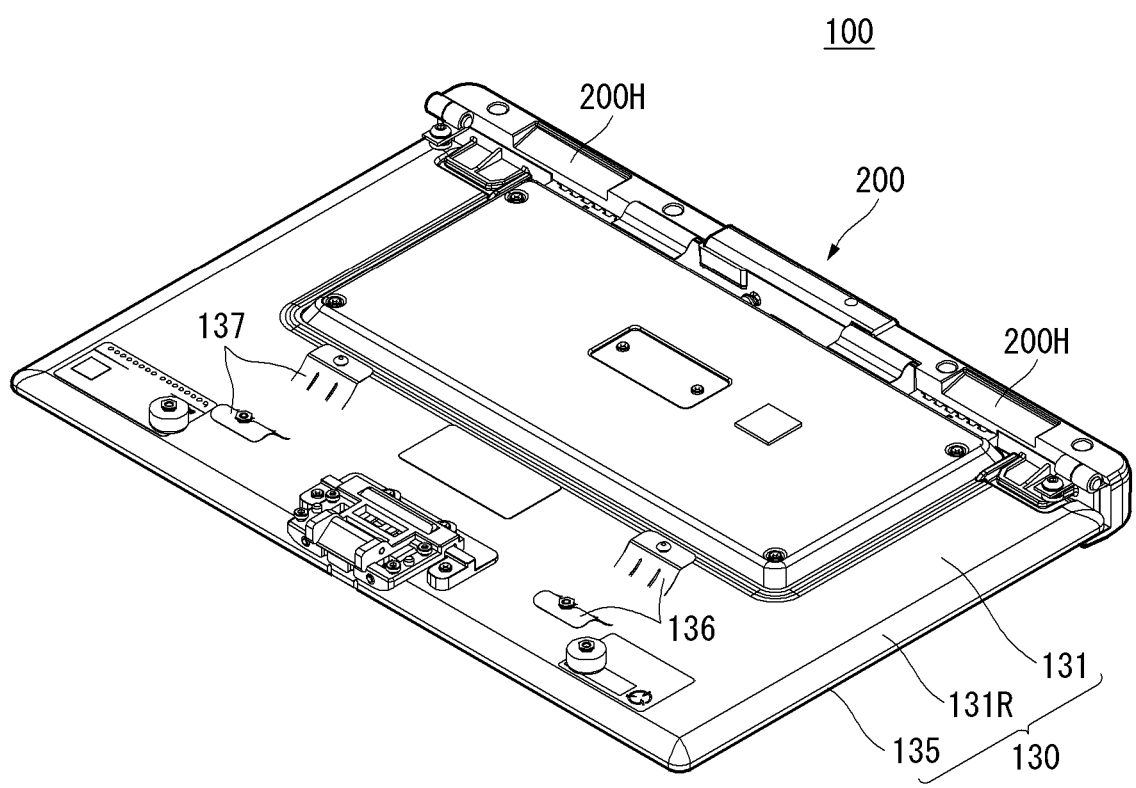

【Figure 5】
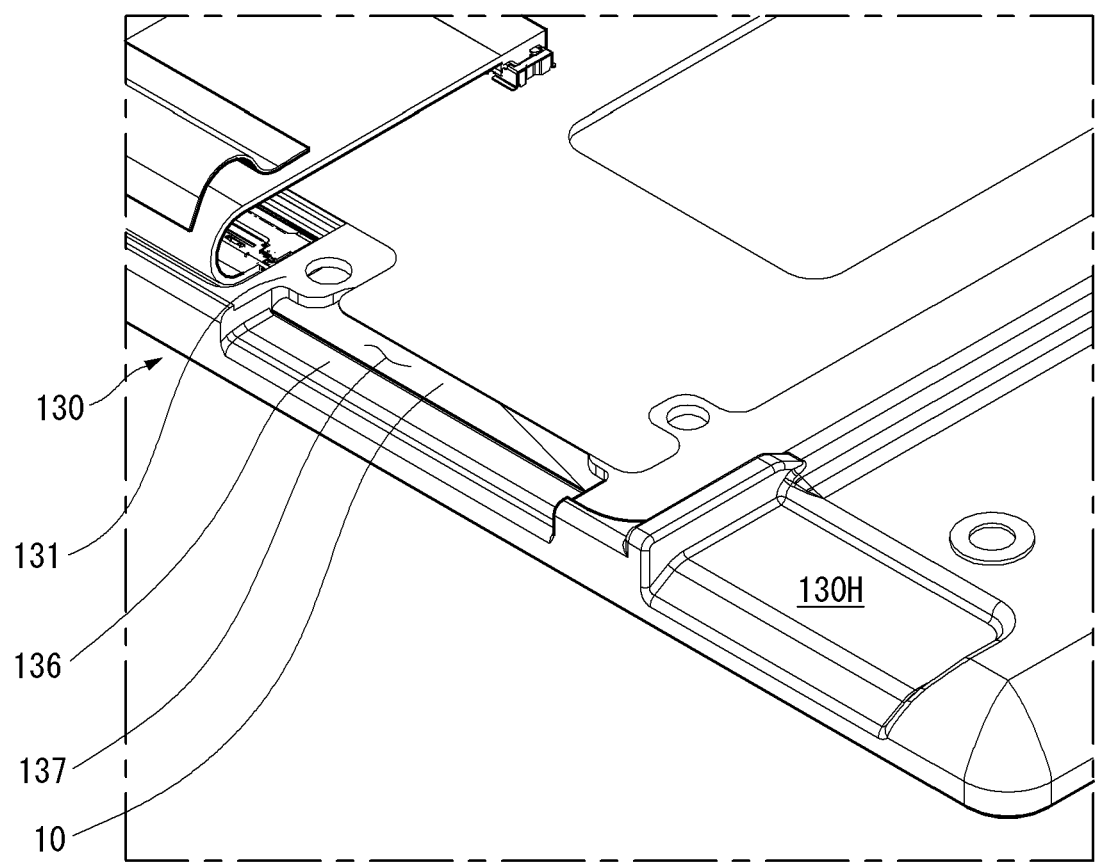

[Figure 6]
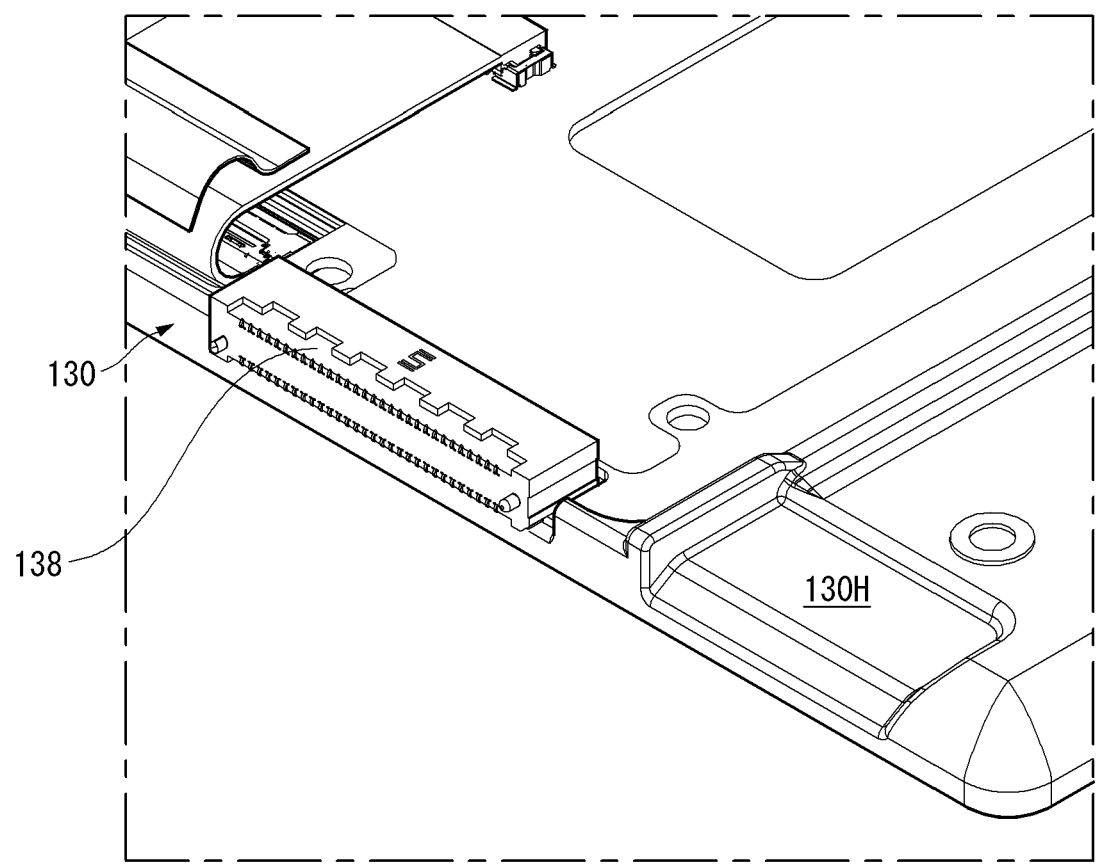

[Figure 7]
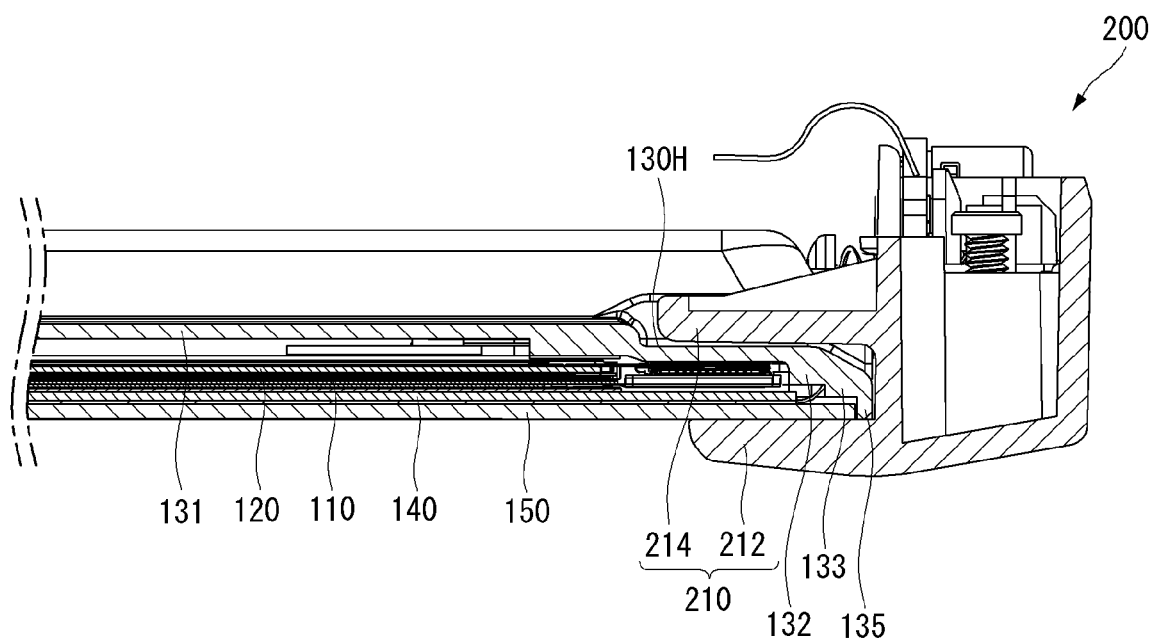

[Figure 8]
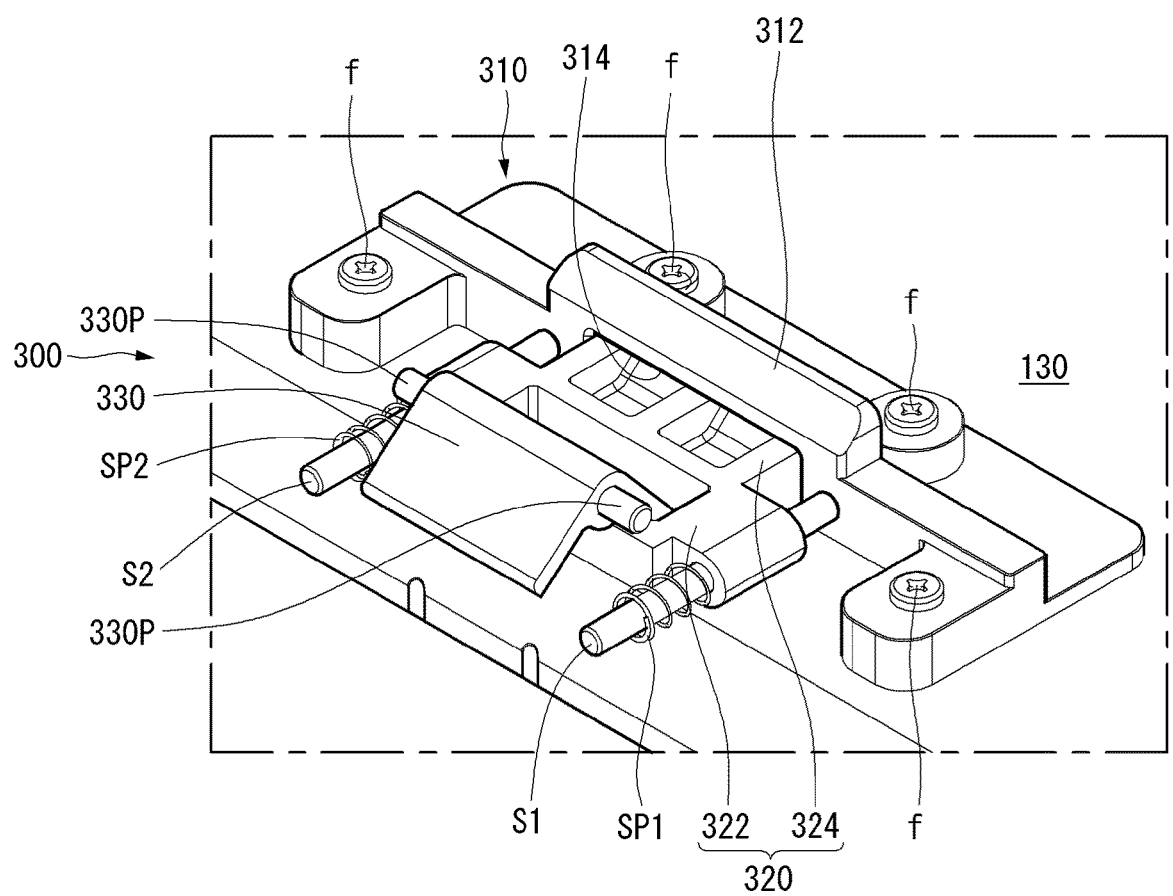

[Figure 9]
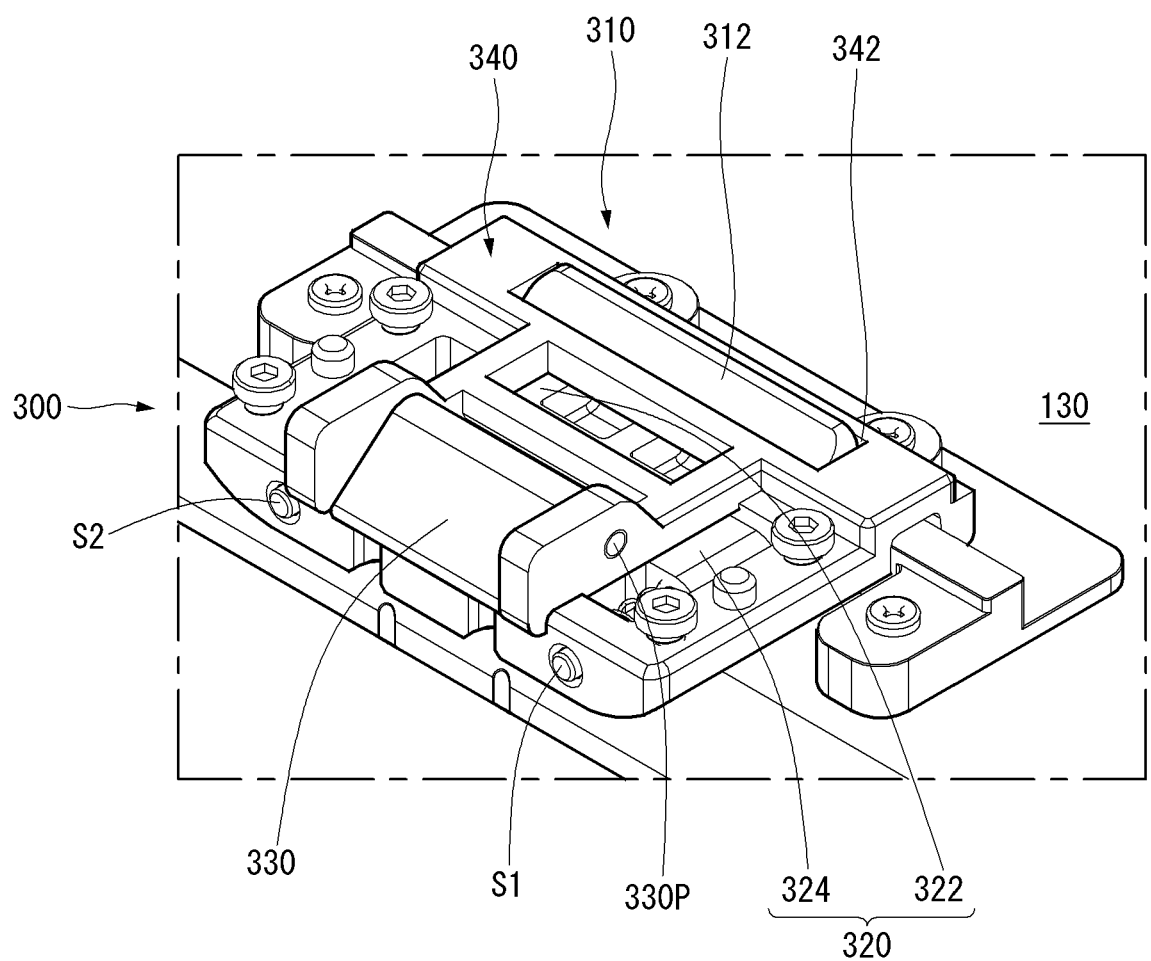

【Figure 10】
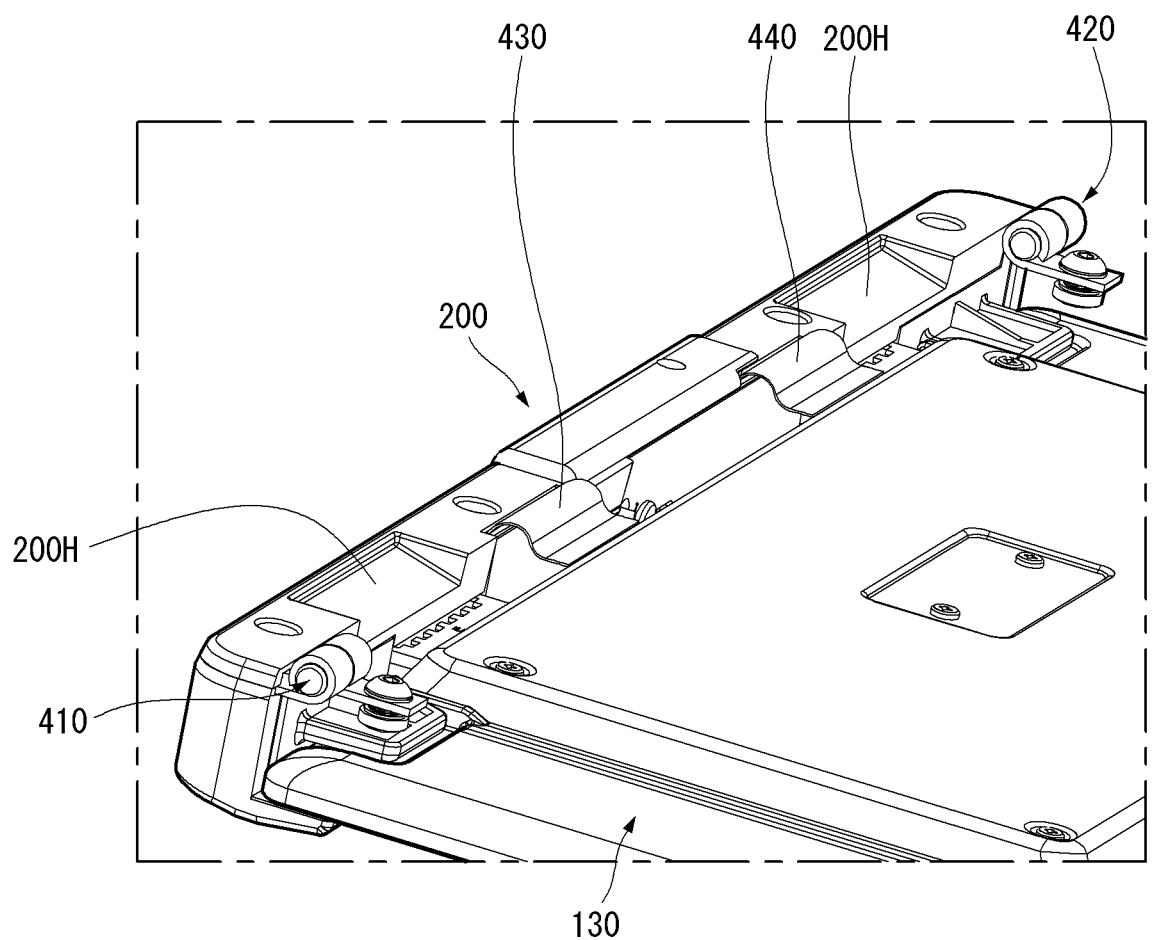

[Figure 11]
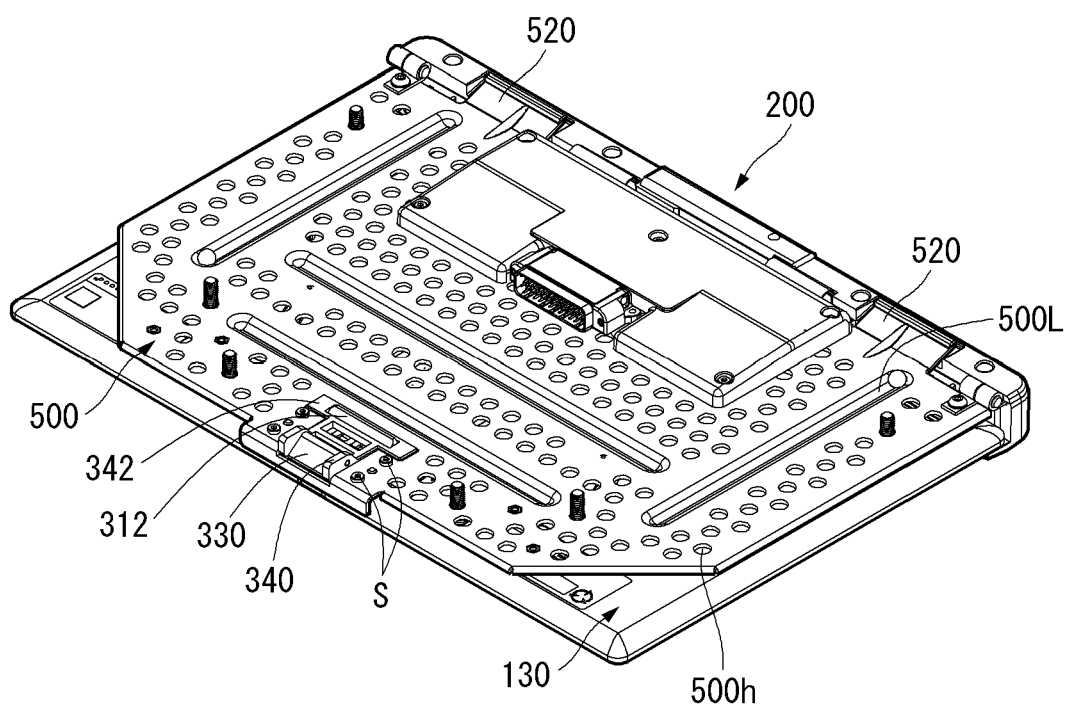

【Figure 12】
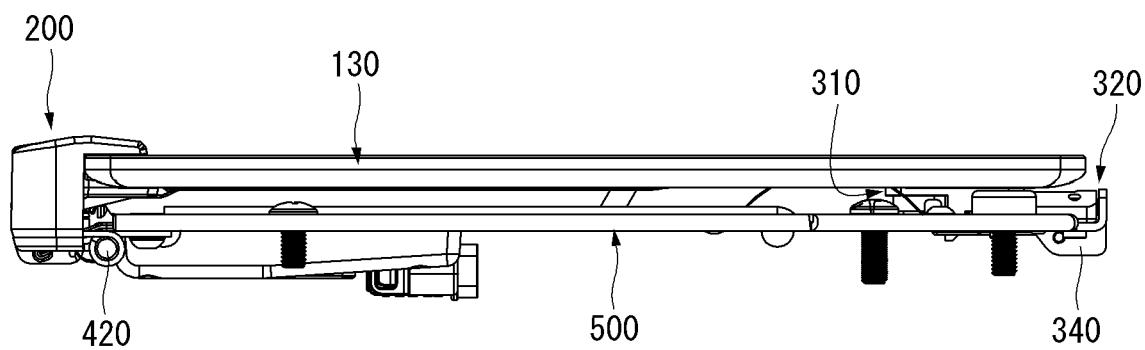

【Figure 13】
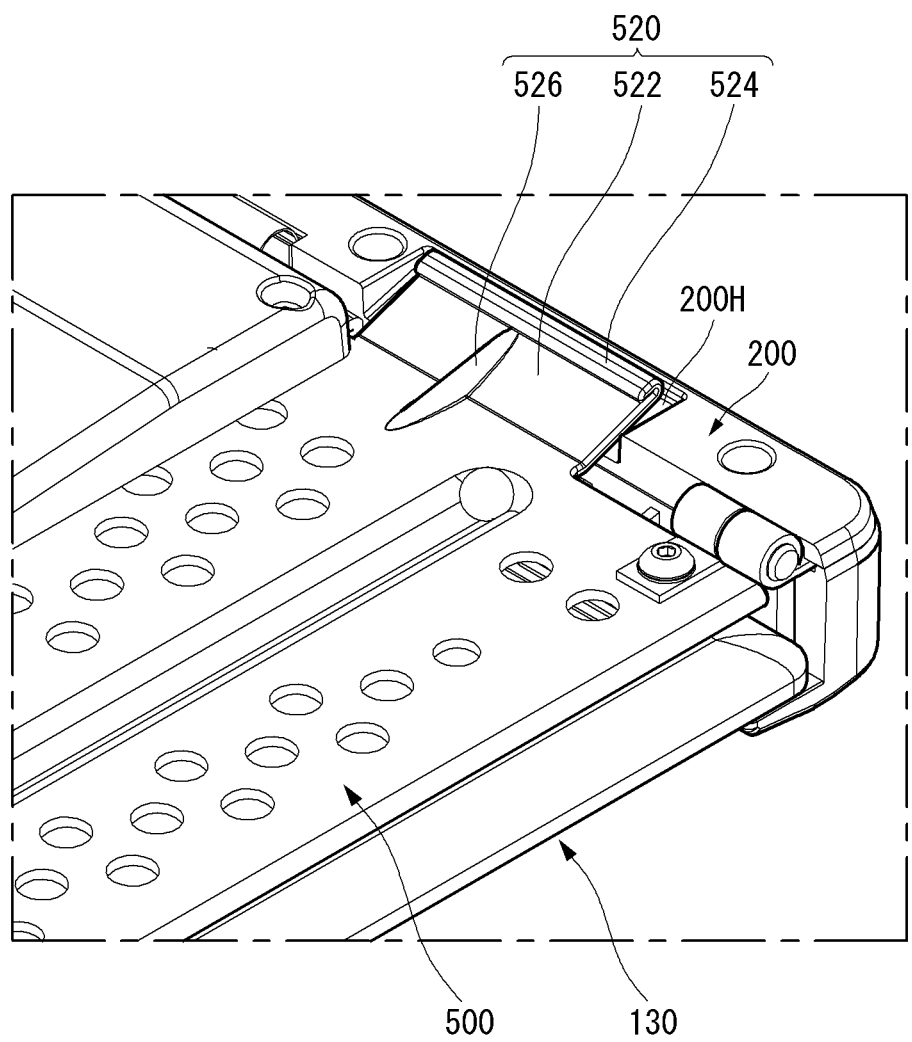

[Figure 14]
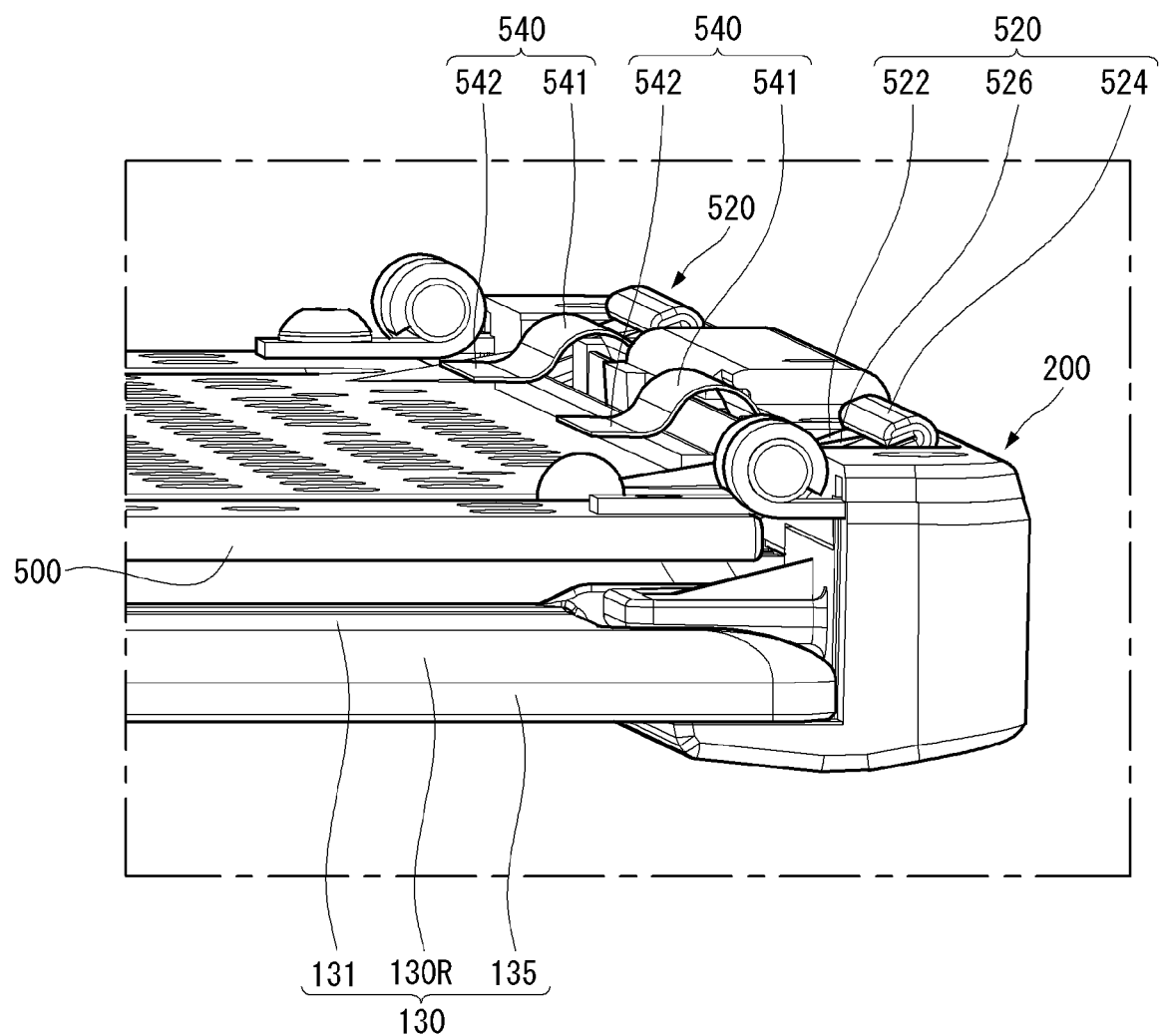

【Figure 15】
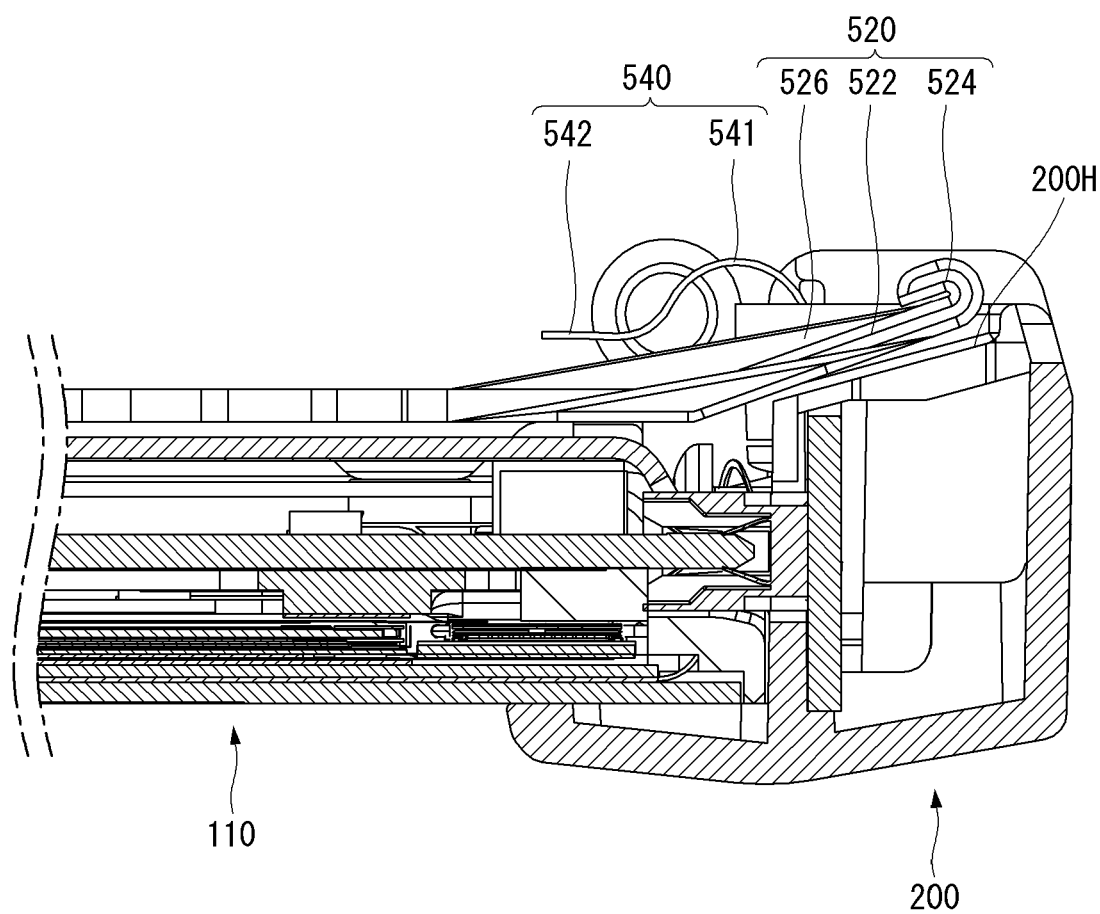

DISPLAY DEVICE

TECHNICAL FIELD

The present disclosure relates to a display device. More particularly, the present disclosure relates to a display device mounted on means of transport such as an aircraft, a vehicle or the like.

BACKGROUND ART

With the development of the information society, various demands for display devices are increasing. Various display devices such as liquid crystal displays (LCDs), plasma display panels (PDPs), electroluminescent displays (ELDs), and vacuum fluorescent displays (VFDs) have been recently studied and used in response to various demands for the display devices.

Among the display devices, a liquid crystal display panel of a liquid crystal display includes a liquid crystal layer and a thin film transistor (TFT) substrate and a color filter substrate that are positioned opposite each other with the liquid crystal layer interposed therebetween. The liquid crystal display panel can display an image using light provided by a backlight unit.

It is recently required to install display devices in various places, and a study on such a structure is actively conducted.

DISCLOSURE

Technical Problem

An object of the present disclosure is to address the above-described and other problems. Another object of the present disclosure is to provide an installation structure of a display device securing a safety.

Another object of the present disclosure is to provide an installation structure of a display device capable of performing a tilting motion at various angles.

Another object of the present disclosure is to provide a display device having durability to cope with an impact that may occur in the event of a collision.

Technical Solution

To achieve the above-described and other objects, in one aspect of the present disclosure, there is provided a display device comprising a display panel; a frame positioned in a rear of the display panel and coupled to the display panel; a bottom frame coupled to a lower side of the frame; a plate positioned in a rear of the frame and hinge-coupled to the bottom frame; and a coupler positioned adjacent to an upper side of the frame and between the plate and the frame and allowing the plate to be detachable from the frame.

According to another aspect of the present disclosure, the coupler may include a first coupler fixed to a rear surface of the frame; a coupling frame fixed to a front surface of the plate; and a second coupler coupled to the coupling frame and caught on the first coupler.

According to another aspect of the present disclosure, the second coupler may include a plurality of shafts fixed parallel to the coupling frame in an up-down direction of the frame; a body moving on the plurality of shafts in the up-down direction of the frame; and a latch protruding from the body and caught on the first coupler according to a motion of the body.

According to another aspect of the present disclosure, the display device may further comprise a plurality of elastic members respectively installed on the plurality of shafts and providing an elastic force to the body; and a lever rotatably coupled to the coupling frame, wherein the lever may be coupled to the body, and wherein as the latch is far away from the first coupler by a rotation of the lever, the plurality of elastic members maybe compressed.

According to another aspect of the present disclosure, the first coupler may include a protrusion that protrudes from the first coupler and is extended in a left-right direction of the frame, and the coupling frame may include a slot that is extended to insert the protrusion and penetrates the coupling frame.

According to another aspect of the present disclosure, the display device may further comprise a stopper extended from a lower side of the plate toward the bottom frame and forming an obtuse angle with a rear surface of the plate; and an accommodating groove formed by recessing a rear surface of the bottom frame, the stopper being insertable into the accommodating groove.

According to another aspect of the present disclosure, the stopper may include a rib that protrudes from the rear surface of the plate and a rear surface of the stopper and is extended from the rear surface of the plate to the rear surface of the stopper.

According to another aspect of the present disclosure, the display device may further comprise a supporter that protrudes from a rear surface of the frame toward the plate, has an elastic force, and contacts a rear surface of the plate when a front surface of the plate faces the rear surface of the frame.

According to another aspect of the present disclosure, the display device may further comprise an elastic member with one side fixed to the bottom frame and having an elastic force, the elastic member being bent and extended from the one side toward the rear surface of the plate, wherein when the plate performs a pivot motion with respect to the frame, the elastic member may contact the rear surface of the plate before the stopper contacts the accommodating groove.

According to another aspect of the present disclosure, the plate may include a plurality of holes.

In another aspect of the present disclosure, there is provided a display device comprising a display panel; a frame positioned in a rear of the display panel and coupled to the display panel; a backlight unit positioned between the display panel and the frame and providing light to the display panel; and a touch panel positioned in front of the display panel, wherein the frame includes a bottom forming a front surface of the frame; a first support forming a stepped portion from the bottom and extended toward a front of the frame; and a second support forming a stepped portion from the first support and extended toward the front of the frame, wherein the display panel is fixed to the first support, and the touch panel is fixed to the second support.

According to another aspect of the present disclosure, the display device may further comprise a first adhesive member fixed on the first support, wherein the display panel may be fixed to the first adhesive member.

According to another aspect of the present disclosure, the display device may further comprise a second adhesive member fixed on the second support, wherein the touch panel may be fixed to the second adhesive member.

According to another aspect of the present disclosure, the display device may further comprise a side wall forming a stepped portion at the second support and extended toward the front of the frame, wherein the side wall may cover a side of the touch panel.

According to another aspect of the present disclosure, the frame may further include a curved portion connecting a rear surface of the bottom and an external surface of the side wall.

According to another aspect of the present disclosure, the curved portion of the frame and the external surface of the side wall may be exposed to the outside, and at least a part of the rear surface of the bottom of the frame may be exposed to the outside.

According to another aspect of the present disclosure, the display device may further comprise a front cover positioned in front of the touch panel, wherein the front cover may be formed of a light transmitting material, and the side wall may cover a side of the front cover.

Advantageous Effects

Effects of a display device according to the present disclosure are described as follows.

According to at least one aspect of the present disclosure, the present disclosure can provide an installation structure of a display device securing a safety.

According to at least one aspect of the present disclosure, the present disclosure can provide an installation structure of a display device capable of performing a tilting motion at various angles.

According to at least one aspect of the present disclosure, the present disclosure can provide a display device having durability to cope with an impact that may occur in the event of a collision.

Further scope of applicability of the present disclosure will become apparent from the detailed description given blow. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DESCRIPTION OF DRAWINGS

FIG. 1 illustrates an example of installing a display device related to the present disclosure.

FIGS. 2 to 7 illustrate examples of a display device according to an embodiment of the disclosure.

FIGS. 8 to 15 illustrate examples of a mount unit of a display device according to an embodiment of the disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features, and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, embodiments of the disclosure are described using a liquid crystal display panel as an example of a display panel, but are not limited thereto. For example, a plasma display panel (PDP), a field emission display (FED) panel, and an organic light emitting diode (OLED) display panel may be used.

In embodiments disclosed herein, a display device (see FIG. 2) may include a first long side LS1, a second long side LS2 opposite the first long side LS1, a first short side SS1 adjacent to the first long side LS1 and the second long side LS2, and a second short side SS2 opposite the first short side SS1.

Herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of a display panel 100, and a second direction DR2 may be a direction parallel to the short sides SS1 and SS2 of the display panel 100. Further, a third direction DR3 may be a direction vertical to the first direction DR1 and/or the second direction DR2.

The first direction DR1 and the second direction DR2 may be commonly referred to as a horizontal direction. Further, the third direction DR3 may be referred to as a vertical direction.

In another point of view, a side or a surface on which the display device displays an image may be referred to as a front side or a front surface. When the display device displays an image, a side or a surface at which the image cannot be observed may be referred to as a rear side or a rear surface. When the display device is observed at the front side or the front surface, the first long side LS1 may be referred to as an upper side or an upper surface. In the same manner as the first long side LS1, the second long side LS2 may be referred to as a lower side or a lower surface. In the same manner, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1;

a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Referring to FIG. 1, a display device 100 may be mounted on an aircraft. In order to provide various contents to passengers, the display device 100 may be installed or mounted on a rear surface of a seat back ST of an aircraft seat.

In an emergency situation that may occur during operation of the aircraft, the passenger may collide with the rear surface of the seat back ST. Hence, the display device 100 installed in the aircraft may be required to have a predetermined level of durability against collision.

Referring to FIGS. 2 and 3, a display panel 110 may be provided in front of the display device 100 and may display an image. The display panel 110 may divide an image into a plurality of pixels and may output the image while controlling color, brightness, and chroma of each pixel. The display panel 110 may be divided into an active area on which an image is displayed, and a de-active area on which the image is not displayed. The display panel 110 may include a front substrate and a rear substrate that are positioned opposite each other with a liquid crystal layer interposed therebetween.

The front substrate may include a plurality of pixels each including red (R), green (G), and blue (B) subpixels. The front substrate may create an image corresponding to red, green, or blue color in response to a control signal.

The rear substrate may include switching elements. The rear substrate may switches on or off pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transfer light, that is provided from the rear of the display panel 110, to the front substrate.

A backlight unit 120 may be positioned in the rear of the display panel 110. The backlight unit 120 may include a plurality of light sources. The light sources of the backlight unit 120 may be arranged in an edge type or a direct type. In case of the direct type backlight unit 120, a diffusion plate may be further included.

The backlight unit 120 may be coupled to a front surface and a side surface of a frame 130. For example, the plurality of light sources may be disposed inside one side of the frame 130. In this case, the backlight unit 120 may be commonly called an edge type backlight unit.

The backlight unit 120 may be driven in an entire driving method or a partial driving method such as a local dimming method and an impulsive driving method. The backlight unit 120 may include an optical sheet and an optical layer.

The optical sheet enables light of the light sources to be uniformly transferred to the display panel 110. The optical sheet may include a plurality of layers. For example, the optical sheet may include at least one prism sheet and/or at least one diffusion sheet. The optical layer may include a light source, and the like.

The frame 130 may serve to support the components of the display device 100. For example, the component such as the backlight unit 120 may be coupled to the frame 130. The frame 130 may be made of a metal material such as an aluminum alloy.

A touch panel 140 may be positioned in front of the display panel 110. Examples of the touch panel 140 may include a capacitive touch panel, a resistive touch panel, an infrared touch panel, an acoustic touch panel, and a pressure touch panel. The touch panel 140 may sense input information obtained through the user's finger.

A front cover 150 may be positioned on a front surface of the touch panel 140. The front cover 150 may be made of, for example, a transparent material and can prevent the touch panel 140 from being damaged.

The frame 130 may include a bottom 131, a first support 132, a second support 133, and a side wall 135. The bottom 131 may be a flat plate forming a rear surface of the frame 130. The first support 132 may be extended from the bottom 131 to the front of the display device 100 while forming a stepped portion. The second support 133 may be extended from the first support 132 to the front of the display device 100 while forming a stepped portion. The side wall 135 may be extended from the second support 133 to the front of the display device 100.

The display panel 110 may be placed on the first support 132. The display panel 110 may be fixed to the first support 132 by a first adhesive member 160. For example, the first adhesive member 160 may be a double-sided tape. The touch panel 140 may be placed on the second support 133. The touch panel 140 may be fixed to the second support 133 by a second adhesive member 170. For example, the second adhesive member 170 may be a glue.

Referring to FIGS. 3 and 4, the frame 130 may include the bottom 131, a curved portion 131R, and the side wall 135. The curved portion 131R may be formed between the bottom 131 and the side wall 135. The side wall 135 may protrude and extend from the second support 133 of the frame 130 toward the front of the frame 130. The side wall 135 may cover a side surface of the touch panel 140 and/or a side surface of the front cover 150. An edge of the frame 130 may be rounded by the curved portion 131R. Hence, the user's finger, etc. can be easily inserted behind the display device 100 embedded in the rear surface, etc. of the aircraft seat, in order to tilt the display device 100.

In this instance, external surfaces of the curved portion 131R and the side wall 135 of the frame 130 may be exposed to the outside, and at least a part of a rear surface of the bottom 131 of the frame 130 may be exposed to the outside. A main board, a T-CON board, etc. may be mounted on the rear surface of the bottom 131 of the frame 130 which is not exposed to the outside. A back cover 1 may cover the main board and the like.

Referring to FIGS. 2 and 4, a docking module 200 may be mounted on a lower side of the frame 130. The docking module 200 may include an input unit IN, an output unit OUT, and/or a remote receiving unit OR, or the like. The docking module 200 may be referred to as a bottom frame 200.

Referring to FIGS. 5 and 6, an opening 137 may be formed in the bottom 131 of the frame 130, and a PCB 10 or a FPCB 10 or a cable 10 may be exposed to the outside through the opening 137 of the frame 130. The PCB 10 may be electrically connected to the display panel 110 (see FIG. 3) and may be exposed to the outside of the frame 130 through the opening 137. One end of the PCB 10 may be inserted into a connector 138. A connector accommodating portion 136 may be recessed in the rear surface of the frame 130. The opening 137 may communicate with the connector accommodating portion 136.

Referring to FIG. 7, the docking module 200 may be electrically connected to the connector 138.

Referring to FIGS. 6 and 7, the frame 130 may have a groove 130H. The groove 130H may be formed while being recessed in the rear surface of the frame 130. The groove 130H may be positioned adjacent to the lower side of the frame 130. One groove 130H may be formed on the left side of the frame 130, and one groove 130H may be formed on the right side of the frame 130.

The docking module 200 may include a holder 210. The holder 210 may be extended from the docking module 200 toward the frame 130. The holder 210 may include a first finger 212 and a second finger 214. The first finger 212 may be positioned on the front surface of the frame 130, and the second finger 214 may be positioned on the rear surface of the frame 130. The second finger 214 may be inserted into the groove 130H formed on the rear surface of the frame 130. The frame 130 may be inserted into the holder 210 and may be fixed by the first finger 212 and the second finger 214.

Referring to FIGS. 8 and 9, a coupler 300 may include a first coupler 310 and a second coupler 320. The first coupler 310 may be adjacent to an upper side of the frame 130 and fixed to the rear surface of the frame 130 by a coupling member f. The first coupler 310 may have an elongated plate shape and may have a hooking groove 314. The second coupler 320 may be inserted into the hooking groove 314 while moving in a direction parallel to the rear surface of the frame 130.

The second coupler 320 may include a body 322 and a latch 324. The body 322 may move on the rear surface of the frame 130 in an up-down direction of the frame 130. The body 322 may be positioned on the first coupler 310. The latch 324 may be extended from one side of the body 322 and may be positioned between the body 322 and the first coupler 310. Shafts 51 and S2 may be extended in the up-down direction of the frame 130 and may include a plurality of shafts. The first shaft 51 may be positioned on one side of the body 322, and the second shaft S2 may be positioned on another side of the body 322. The body 322 may move at the shafts 51 and S2 in the up-down direction of the frame 130. Elastic members SP1 and SP2 may be inserted into the shafts 51 and S2 to provide an elastic force to the body 322.

A coupling frame 340 may cover the first coupler 310 and the second coupler 320 and may be positioned on the rear surface of the frame 130. The second coupler 320 may be installed or mounted on the coupling frame 340. The plurality of shafts 51 and S2 may be mounted on the coupling frame 340, and the body 322 of the second coupler 320 may move up and down along the shafts 51 and S2 with respect to the coupling frame 340.

A lever 330 may be pivotally connected (330P) to the coupling frame 340. For example, the lever 330 may have ꓶ-shape. The lever 330 may move the body 322 by its rotation.

The coupling frame 340 may have a slot 342 that is formed to be elongated, and the first coupler 310 may include a protrusion 312 or a barrier 312 inserted into the slot 342. Hence, the first coupler 310 and the second coupler 320 may be aligned.

Referring to FIGS. 10 to 12, a plate 500 may be positioned in the rear of the frame 130 and may be pivotally connected to the frame 130 or the docking module 200. For example, the docking module 200 may include hinges 410 and 420. The hinges 410 and 420 may be provided in plural, and the plurality of hinges 410 and 420 may be respectively positioned on both sides of the docking module 200. The plate 500 may be coupled to the hinges 410 and 420. The plate 500 may have a plurality of holes 500h. The plurality of holes 500h may have a uniform distribution in the area of the plate 500 and may be formed in the plate 500. Hence, weight lightening of the plate 500 can be achieved, and a heat dissipation effect of the display device can be improved.

The plate 500 may include ribs 500L. The ribs 500L may be formed by pressing the plate. The coupling frame 340 may be fixed to a front surface of the plate 500. For example, the coupling frame 340 may be adjacent to an upper side of the plate 500 and may be fixed to the front surface of the plate 500 by a screw S. As illustrated in FIG. 12, the frame 130 and the plate 500 may face each other at a predetermined distance in a state where the second coupler 320 is confined to the first coupler 310.

Referring to FIGS. 4 and 12, the frame 130 may include supporters 136 and 137. The supporters 136 and 137 may be formed on the rear surface of the frame 130. The supporters 136 and 137 may have an elastic force. For example, the supporters 136 and 137 may be a leaf spring. As illustrated in FIG. 12, the supporters 136 and 137 may contact the front surface of the plate 500 in a state where the plate 500 is opposite to the rear surface of the frame 130. In this instance, the supporters 136 and 137 may be in a state of providing an elastic force to the plate 500. That is, the supporters 136 and 137 can provide a buffer force to the frame 130 in a process of confining or tilting the frame 130 at the plate 500.

Referring to FIGS. 11 and 13, the plate 500 may include a stopper 520. The stopper 520 may be positioned adjacent to a lower side of the plate 500 and may be extended outwardly from the plate 500. The stopper 520 may protrude and extend from the plate 500 toward the docking module 200. The stopper 520 may be a flat plate 522 and may be bent while maintaining a predetermined angle with respect to the plate 500. For example, a rear surface of the plate 500 and a rear surface 522 of the stopper 520 may form an obtuse angle.

One side of the stopper 520 may be hammered (524). A rib 526 may be formed on the rear surface of the plate 500 and a rear surface of the stopper 520. The rib 526 may protrude from the rear surface of the plate 500 and the rear surface of the stopper 520 and may be extended from the plate 500 to the stopper 520. The docking module 200 may include a stopper accommodating portion 200H on its rear surface. The stopper accommodating portion 200H may be recessed to the inside of the docking module 200 and may have a shape corresponding to the stopper 520. The stopper accommodating portion 200H may be referred to as an accommodating groove 200H.

Accordingly, when the plate 500 performs a tilting motion with respect to the frame 130, a range of motion may be limited, and the plate 500 and the stopper 520 may be provided with rigidity.

Referring to FIGS. 14 and 15, an elastic member 540 may be fixed to the docking module 200 to provide an elastic force to the rear surface of the plate 500. For example, the elastic member 540 may be a leaf spring. The elastic member 540 may include a first part 541 having a circular cross section and a second part 542 of a flat plate shape. The first part 541 may be fixed to the docking module 200. The second part 542 may be extended from the first part 541 and may face the rear surface of the plate 500. Hence, when the plate 500 is tilted with respect to the frame 130, the elastic member 540 may provide a buffer force to the plate 500. For example, when the plate 500 is tilted, the elastic member 540 may contact the rear surface of the plate 500 before the stopper 520 contacts the stopper accommodating portion 200H.

The plate 500, the coupler 300, and the related components described above may be referred to as mount units.

Some embodiments or other embodiments of the disclosure described above are not mutually exclusive or distinct from each other. Some embodiments or other embodiments of the disclosure described above may be combined with each other in terms of configuration or function.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:
a display panel;
a frame located at a rear side of the display panel and coupled to the display panel;
a bottom frame coupled to a lower side of the frame;
a plate located at a rear side of the frame, a lower side of the plate coupled to the bottom frame by a hinge; and
a coupler positioned adjacent to an upper side of the frame and located between the plate and the frame, the coupler allowing the plate to be detachable from the frame,
wherein the coupler is spaced apart from the hinge and does not contact the hinge,
wherein the coupler comprises a first coupler fixed to a rear surface of the frame, a coupling frame fixed to a front surface of the plate, and a second coupler coupled to the coupling frame and received on the first coupler, and
wherein the second coupler comprises a plurality of shafts fixed parallel to the coupling frame in an up-down direction of the frame, a body moving on the plurality of shafts in the up-down direction of the frame, and a latch protruding from the body and received on the first coupler according to a motion of the body.

2. The display device of claim 1, further comprising:
a plurality of elastic members respectively installed on the plurality of shafts and providing an elastic force to the body; and
a lever rotatably coupled to the coupling frame,
wherein the lever is coupled to the body, and
wherein as the latch is moved away from the first coupler by a rotation of the lever, the plurality of elastic members is compressed.

3. The display device of claim 2, wherein the first coupler comprises a protrusion that protrudes from the first coupler and is extended in a left-right direction of the frame,
wherein the coupling frame comprises a slot to which the protrusion is inserted such that the protrusion penetrates the coupling frame.

4. The display device of claim 1, further comprising:
a stopper extended from a lower side of the plate toward the bottom frame and forming an obtuse angle with a rear surface of the plate; and
an accommodating groove formed by recessing a rear surface of the bottom frame, the stopper being insertable into the accommodating groove.

5. The display device of claim 4, wherein the stopper comprises a rib that protrudes from the rear surface of the plate and a rear surface of the stopper and is extended from the rear surface of the plate to the rear surface of the stopper.

6. The display device of claim 1, further comprising a supporter that protrudes from a rear surface of the frame toward the plate, has an elastic force, and contacts a rear surface of the plate when a front surface of the plate faces the rear surface of the frame.

7. The display device of claim 4, further comprising an elastic member with one side fixed to the bottom frame and having an elastic force, the elastic member being bent and extended from the one side toward the rear surface of the plate,
wherein when the plate performs a pivot motion with respect to the frame, the elastic member contacts the rear surface of the plate before the stopper contacts the accommodating groove.

8. The display device of claim 1, wherein the plate includes a plurality of holes.

9. The display device of claim 1, further comprising:
a backlight unit located between the display panel and the frame and providing light to the display panel; and
a touch panel located at a front side of the display panel,
wherein the frame comprises:
a bottom forming a front surface of the frame;
a first support forming a stepped portion from the bottom and extended toward the front surface of the frame; and
a second support forming a stepped portion from the first support and extended toward the front surface of the frame,
wherein the display panel is fixed to the first support, and
wherein the touch panel is fixed to the second support.

10. The display device of claim 9, further comprising a first adhesive member located between the display panel and the first support to fix the display panel to the first support.

11. The display device of claim 9, further comprising a second adhesive member located between the touch panel and the second support to fix the touch panel to the second support.

12. The display device of claim 9, further comprising a side wall forming a stepped portion at the second support and extended toward the front of the frame,
wherein the side wall covers a side of the touch panel.

13. The display device of claim 12, wherein the frame further comprises a curved portion connecting a rear surface of the bottom and an external surface of the side wall.

14. The display device of claim 13, wherein the curved portion of the frame and the external surface of the side wall are exposed to outside such that at least a part of the rear surface of the bottom of the frame is exposed to the outside.

15. The display device of claim 12, further comprising a front cover located at a front side of the touch panel,
wherein the front cover is formed of a light transmitting material, and
wherein the side wall covers a side of the front cover.

* * * * *